United States Patent [19]
Falk et al.

[11] 3,886,201
[45] May 27, 1975

[54] PERFLUOROALKYL ESTERS OF MERCAPTO- AND THIO-CARBOXYLIC ACIDS

[75] Inventors: Robert Allan Falk, New City; Eduard Karl Kleiner, New York, both of N.Y.

[73] Assignee: Ciba-Geigy Corporation, Ardsley, N.Y.

[22] Filed: Nov. 17, 1971

[21] Appl. No.: 199,715

[52] U.S. Cl............ 260/481 R; 117/139.5; 260/470; 260/386
[51] Int. Cl............................................. C07c 153/07
[58] Field of Search ................................. 260/481 R

[56] References Cited
UNITED STATES PATENTS
3,172,910  3/1965  Brace ............................ 260/481 R
3,716,466  2/1973  Hook ............................. 260/481 R Primary Examiner—John F. Terapane
Attorney, Agent, or Firm—Joseph G. Kolodny; Edward McC. Roberts; Prabodh I. Almaula

[57] ABSTRACT

Novel perfluoroalkyl group containing mercaptans and sulfides are disclosed having soil repellent properties if applied to substrates such as textiles, paper and leather and being useful as intermediates for the synthesis of soil repellent polymers. The adducts are obtained by the base or free radical catalyzed addition of hydrogen sulfide or mono- or polymercaptans to perfluoroalkyl group containing esters of fumaric, maleic, citraconic, mesaconic, itaconic, methylene malonic or aconitic acid.

12 Claims, No Drawings

PERFLUOROALKYL ESTERS OF MERCAPTO- AND THIO-CARBOXYLIC ACIDS

The invention relates to novel mercaptans and sulfides which possess soil repellent properties when applied to various substrates, In addition the novel mercaptans are useful in the reparation of polymers which also are useful for similar applications. The soil repellency finishes are useful to treat materials such as textiles, paper, leather, painted wooden, metallic surfaces and the like.

The compounds of the present invention are of the following formula:

I 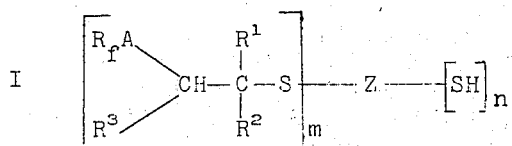

wherein $R^1$, $R^2$ and $R^3$ are hydrogen, methyl, $R_fA$ or $R_fACH_2$ with the requirement that at least one or two of $R^1$, $R^2$ and $R^3$ represent $R_fA$ or $R_fACH_2$, $R_f$ is a perfluoroalkyl group of 2 to 18 carbon atoms and more preferably 6 to 12 carbon atoms;

$AR_f$ is

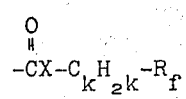 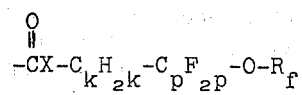

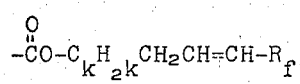 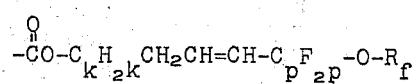

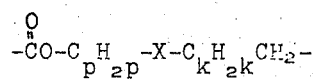 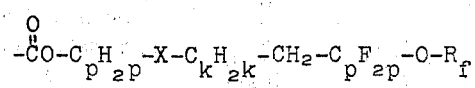

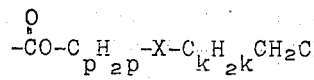 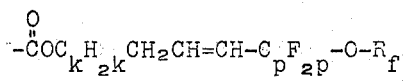

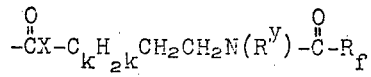 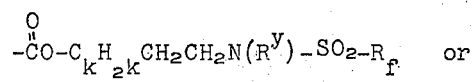 or

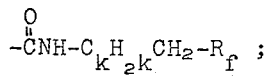

X is oxygen or sulfur;
K is zero to 10;
p is 2 to 12;
$R^y$ is hydrogen or alkyl of 1 to 4 carbon atoms;
Z represents B, H or

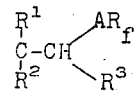

with the proviso if Z represents H, n will be zero and m will be 1, or if Z represents

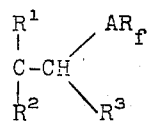

n will be zero and m will be 1
B is an inert linkage group;
m is 1 to 10;
n is zero to 9.

When Z equals B and n is a positive integer greater than zero, a compound of the following formula is obtained:

Ia 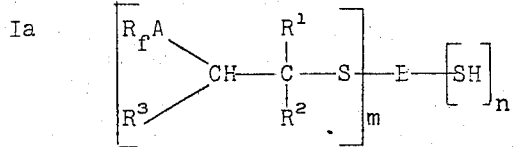

In contrast if Z represents B but n equals zero, the following is realized:

II 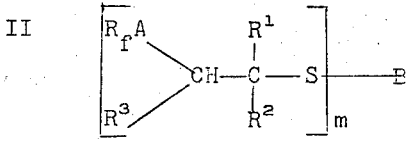

If Z represents H, n will be zero, m will be one and the compound will be:

IIa 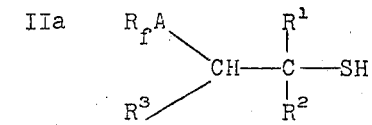

If Z represents

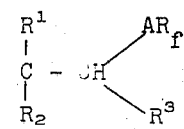

the compound is:

IIb 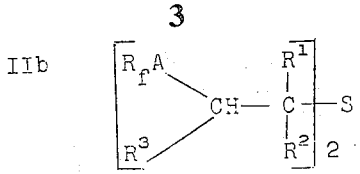

In the above definition B is required to be an inert linkage group. Inert in the present context is employed in its normal definition so that B remains as a discrete unreacted group in the starting and final compounds.

A suitable method for forming the adduct of formula I, Ia and II, IIa, IIb supra involves a base or free radical catalyzed addition reaction of $\alpha$, $\beta$-unsaturated di- or triesters of the formula:

III 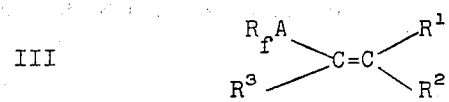

to hydrogen sulfide ($H_2S$) or mono- or polymercaptans of the formula:

IV 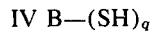 B—(SH)$_q$

In formulas III and IV the substituents have been defined previously while $q$ is an integer from 1 to 10. (Formula IV)

The type of esters of formula III which may be employed are derived from fumaric, maleic, citraconic, mesaconic, itaconic, methylene malonic, and aconitic acids. The formula III esters are defined to be:

| Type Ester | $R^1$ | $R^2$ | $R^3$ |
|---|---|---|---|
| Fumarate | —H | —AR$_f$ | —H |
| Maleate | —AR$_f$ | —H | —H |
| Mesaconate | —H | —AR$_f$ | —CH$_3$ |
| Citraconate | —AR$_f$ | —H | —CH$_3$ |
| Itaconate | —H | —H | —CH$_2$AR$_f$ |
| Methylene malonate | —H | —H | —AR$_f$ |
| cis-Aconitate | —H | —AR$_f$ | —CH$_2$AR$_f$ |
| trans-Aconitate | —AR$_f$ | —H | —CH$_2$AR$_f$ |

In the foregoing formula, -AR$_f$ may be for example:

wherein
X is oxygen or sulfur,
$k$ is zero to 10,
$p$ is 2 to 12,
$R^y$ is hydrogen or alkyl of 1 to 4 carbons
$R_f$ is a perfluoroalkyl group with 2 to 18 carbons, straight or branched, and preferably 6 to 12 carbons.

The preparation of perfluoroalkyl containing esters disclosed herein and especially useful in preparing the novel compounds or adducts of the present invention are described in the following copending applications assigned to the assignee of the present invention:

Ser. No. 720,370, filed Apr. 10, 1968, in the names of Eduard K. Kleiner and Martin Knell; Ser. No. 732,040, filed May 27, 1968, in the names of Eduard K. Kleiner, Martin Knell and Pier Luigi Pacini now U.S. Pat. No. 3,658,857; Ser. No. 812,439, filed Apr. 1, 1969, in the name of Eduard K. Kleiner now U.S. Pat. No. 3,636,085; Ser. No. 820,647, filed Apr. 30, 1969, in the name of Eduard K. Kleiner now U.S. Pat. No. 3,658,843; and Ser. No. 833,706, filed June 16, 1969, in the names of Eduard K. Kleiner and Pier Luigi Pacini now U.S. Pat. No. 3,645,985.

The disclosure of these copending applications for the preparation of the starting esters and the related subject matter is incorporated by reference herein.

Referring to the starting mono or polymercaptans, the formula compound B—(SH)$_q$ is utilized where $q$ is an integer from 1 to 10. Most desirably from the standpoint of the final utility of the invention are the tetra to hexamercaptans. In the above formula B serves as an inert linkage group for the SH radical. Thus it will be immediately recognized that a wide variety of linkage groups may be employed. Since B serves as a connecting bridge to the mercaptan for the initial reactant in formula IV and as a connecting bridge on the novel adducts of formula I, Ia, and II, the sole criticality for B is that it remain intact throughout the reaction. In other words B is not considered to be reactive in formula I, Ia, II and IV and will be an inert portion.

The following mono and polymercaptans are considered illustrative of the linkage group B where $B^I$, $B^{II}$

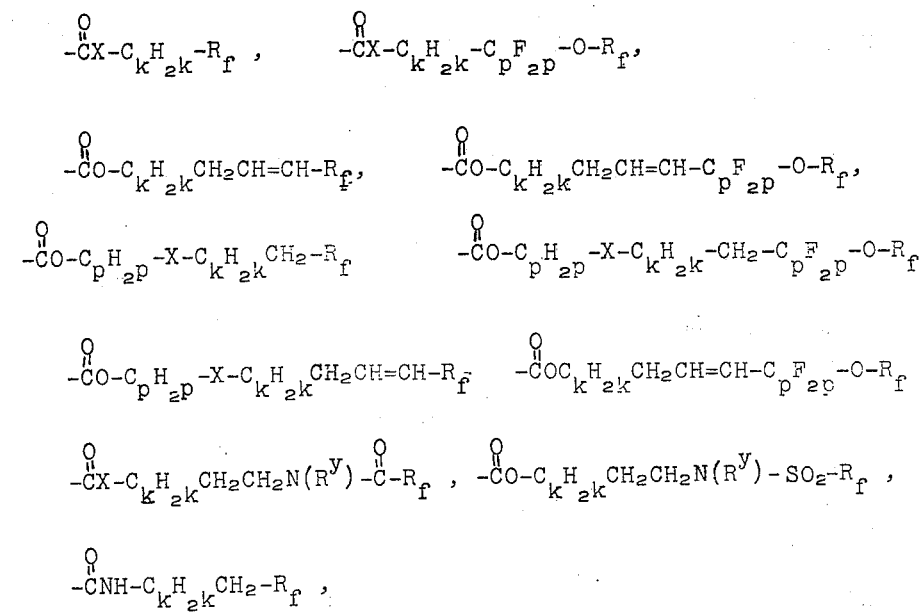

and B$^{111}$ represent respectively mono, di and higher mercaptans:

a. Mono-mercaptans B$^1$—SH, wherein B$^1$ may be: alkyl with 1 to 24 carbons and preferably 6 to 18 carbons, cycloalkyl, aryl with 6 to 24 carbons, aralkyl with 7 to 24 carbons, and -alkylene-CO$_2$-alkyl,aryl, or aralkyl.

Preferred monomercaptans of the above type are for example:

Hexyl, octyl, decyl, dodecyl, hexadecyl and octadecyl mercaptan, thiophenol; thionaphthol; benzyl, 3-phenylpropyl, triphenylmethyl, dodecylbenzyl and cyclohexyl mercaptan, octyl thioglycolate; dioctyl thiomalate. Of special interest are also fluorinated alkyl mercaptans with 4 to 24 carbon atoms of which 3 to 18 of the carbon atoms are fluorinated. Such mercaptans with the formula $$Q—R_f'—C_kH_{2k}CH_2SH,$$

wherein

Q is hydrogen, chlorine or fluorine and $R_f'$ is perfluoroalkylene with 2 to 18 carbons and $k$ is zero to 10 are described in the following U.S. Pat. Nos.:

2,894,991; 2,961,470; 2,965,677; 3,088,849; 3,172,910; 3,554,663

Most preferred are perfluoroalkyl mercaptans of the type $R_fCH_2CH_2SH$.

b. Dimercaptans B$^{11}$—(SH)$_2$, wherein B$^{11}$ may be: alkylene; alkylene-O-alkylene-; alkylene-S-alkylene; alkylene-CO$_2$-alkylene-O$_2$C-alkylene, cyclohexylene, phenylene, naphthylene, phenylenedimethylene, biphenylylene, phenylene-O-phenylene, phenylene-S-phenylene, Preferred dimercaptans of this type are:
1,2-ethanedithiol; 1,4-butanedithiol, 1,8-octanedithiol; 2,2'-oxydiethanethiol, 2,2'-thiodiethanethiol; ethylene-bis-thioglycolate, ethylene-bis-thiopropionate, 3,4-dimercaptotoluene, xylylenedithiol, hydroquinonedithiol, biphenyl-4,4'-dithiol, phenoxybenzene-4,4'dithiol.

c. Polymercaptans B$^{111}$—(SH)$_{3\ to\ 10}$ are more complex mercaptans and most important are: esters of thioglycolic and mercaptopropionic acid and polyhydroxy compounds with 3 to 10 hydroxy groups as the following examples show:

Polymercaptans with 8 to 10 mercapto groups can be prepared by esterifying tripenta- and tetrapentaerythritol with thioglycolic and thiopropionic acid. Instead of pentaerythritol or homologs thereof, other polyhydroxy compounds such as sorbitols etc. may be employed to synthesize useful polymercaptans.

Another most useful class of polymercaptans are derived from mono- or polyepoxides and thioglycolic or related acids according to the following equation:

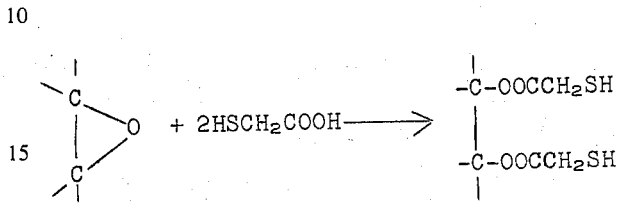

as described in the following patents:

FP 1,103,764,          U.S. Pat. No. 2,992,210

Commercially available mono- or polyepoxides from which useful polymercaptans can be derived are described in "Encyclopedia of Polymer Science and Technology," Volume 6, pages 209—271(John Wiley and Sons, Inc. 1967)

A specific example is given below:

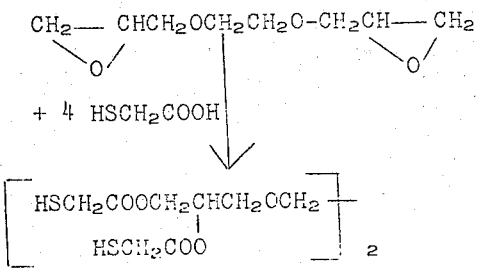

Other useful polymercaptans are: Mercapto terminated oligomers or polymers such as mercaptan terminated polybutadiene sold by B. F. Goodrich Chemical Company under the brand name of Hycar MTB, or MTBN for which the following properties are given:

|  | Hycar MTB (Hycar 2000X158) Polybutadiene with mercaptan terminal groups | Hycar MTBN (Hycar 1300X10) Butadiene-acrylonitrile copolymer with mercaptan terminal groups |
|---|---|---|
| Mercaptan content, % | 2.8 | 3.85 |
| Bound acrylonitrile, % | — | 24.0 |
| Specific gravity, 25°/25°C. | .93 | .98 |
| Brookfield viscosity, at 27°C., cps | 20,000 | 35,000 |
| Molecular weight, $M_n$ | 3,000 | — |

| | |
|---|---|
| Pentaerythritol tetra(3-mercaptopropionate) | C(CH$_2$OOCCH$_2$CH$_2$SH)$_4$ |
| Pentaerythritol tetrathioglycolate | C(CH$_2$OOCCH$_2$SH)$_4$ |
| Trimethylolethane tri(3-mercaptopropionate) | CH$_3$C(CH$_2$OOCCH$_2$CH$_2$SH)$_3$ |
| Trimethylolethane trithioglycolate | CH$_3$C(CH$_2$OOCCH$_2$SH)$_3$ |
| Trimethylolpropane tri(3-mercaptopropionate) | CH$_3$CH$_2$C(CH$_2$OOCCH$_2$CH$_2$SH)$_3$ |
| Trimethylolpropane trithioglycolate | CH$_3$CH$_2$C(CH$_2$OOCCH$_2$SH)$_3$ |
| Dipentaerythritol hexathioglycolate | —O[—CH$_2$—C(CH$_2$OOCCH$_2$SH)$_3$]$_2$ |
| Dipentaerythritol hexa(3-mercaptopropionate) | —O[—CH$_2$C(CH$_2$OOCH$_2$CH$_2$SH)$_3$]$_2$ |

With monomercaptans, only type II adducts are obtained by adding one mole of III to one mole of IV. With polymercaptans, type II adducts are obtained only if the number of moles of III is equal to the number of free —SH groups per mole of IV. If the number of moles of III is smaller than the number of free SH-groups, type Ia adducts, usually a mixture, are obtained, as the following example shows:

rated by one or more backbone carbons. For this reason it is most important that at least one of the substituents $R^1$, $R^2$ or $R^3$ in the esters of type III

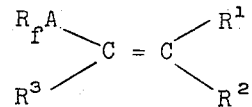

is $R_fA$ or $R_fACH_2$ — as defined earlier. α, β-unsaturated esters where $R^1$, $R^2$, and $R^3$ are hydrogen or methyl, as is the case for perfluoroalkyl acrylates or methacrylate, give adducts with considerably lower oil repellencies for the reason explained if compared on an equal fluorine on fabric basis:

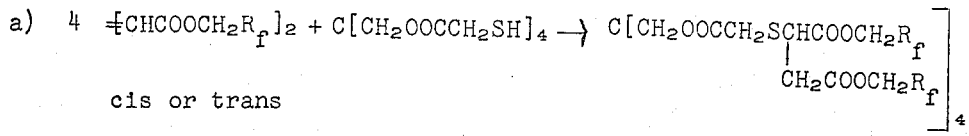

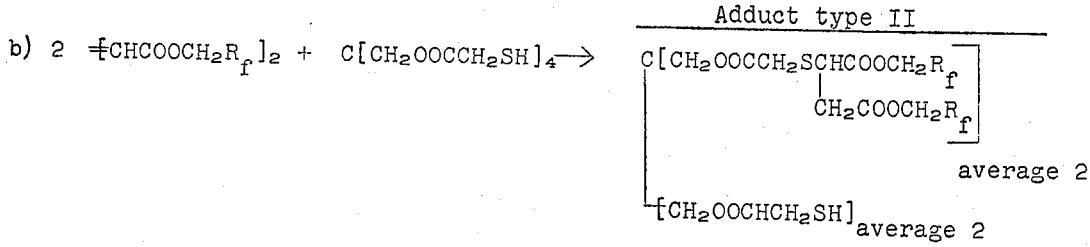

All adducts of types I, Ia and II, IIa, IIb are characterized by having two or three closely packed $R_f$-groups per reacted —SH group in the adduct molecule. This fact is most important since close packed pairs or triplets of $R_f$-groups in a molecule give considerable higher oil repellency ratings if compared with a molecule containing isolate $R_f$-groups, i.e., $R_f$-groups which are separated Adduct derived from a $R_f$-maleate or fumarate e.g. 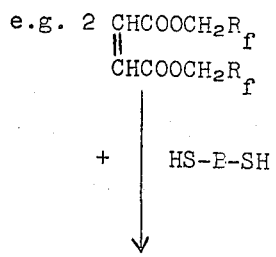

+ HS-B-SH

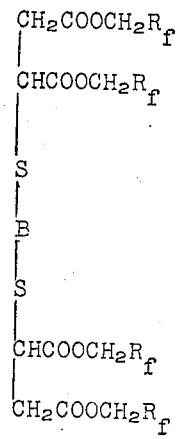

Adduct derived from a $R_f$-acrylate or methacrylate e.g. 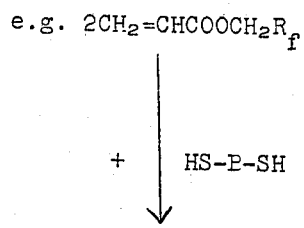

+ HS-B-SH

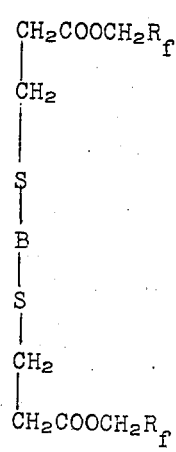

| All $R_f$-groups present in closely packed pairs (or triplets in case of aconitates), = high repellency; also: Two (or three) $R_f$-groups are introduced per SH-group. | All $R_f$-groups present as isolated singlets, = lower repellency; also: Just one $R_f$-group is introduced per SH-group. |
|---|---|

The addition of hydrogen sulfide or mercaptans of type IV to α, β-unsaturated di- and triesters of type III is accomplished either by a base or free radical catalysis.

The base catalyzed addition reaction of hydrogen sulfide or mercaptans to α, β-unsaturated esters is well known and described in detail in:

Houben-Weyl, Methoden der Organischen Chemie, Volume 9, pages 123 to 126 (George Thieme Verlag, Stuttgart, 1955)

The preferred bases recommended for such addition-reactions, in amounts from 0.01 to 2% at temperatures varying from room temperatures to 100°C, are generally strong inorganic or organic bases such as:

Sodium or potassium methoxide or ethoxide, benzyltrimethylammonium hydroxide, piperidine, or pyridine.

It was found, however, that the mercaptan or hydrogen sulfide can be added to α, β-unsaturated di- and triesters of type III with very weak organic bases such as tertiary amines, as for instance:

triethylamine
N-methylmorpholine
triethylenediamine
N,N-dimethylpiperazine
N-ethylmorpholine
tetramethyl-1,4-butane-diamine
diethylcyclohexylamine
dimethylethanolamine
dimethylethylamine
diethylmethylamine The use of such weak bases has many advantages, such as the reduced formation of colored byproducts; the possibility of leaving the weak base in the final product simplifies the work-up procedure and reduces costs; little or no reaction occurs with solvents sensitive toward strong bases such as ketones or esters.

It is also possible to use free radical initiators or U.V. light for the addition of hydrogen sulfide or mercaptans of type IV to di- and triesters of type III. This is possible because the di- triesters of type III are in contrast to acrylic esters, very reluctant toward homopolymerization. A suitable catalyst may be any one of the commonly known agents for initiating the polymerization of vinyl monomers such as azo-initiators, (e.g., azobisisobutyronitrile) or aliphatic and aromatic acyl peroxides, e.g., decanoyl peroxide, lauroyl peroxide, benzoyl peroxide, dialkyl peroxides e.g., t-butyl peroxide, cumyl peroxide; or hydroperoxides, e.g., t-butylhydro peroxide, cumene hydroperoxide, or peresters and peroxycarbonates, e.g., t-butyl perbenzoate.

The addition of hydrogen sulfide or the mercaptans to the di- and triesters of type III is usually carried out in a solvent in which the reactants and preferably also the adduct are soluble at the reaction temperature employed. Suitable solvents are aliphatic or aromatic hydrocarbons such as heptane, benzene, toluene, etc; chlorinated or fluorinated aliphatic or aromatic hydrocarbons such as methylene chloride, chloroform, methyl chloroform, carbon tetrachloride, trichloroethylene, perchloroethylene, Freon's such as 1,1,2-trifluoro-1,2,2-trichloroethane, etc., chlorobenzene, benzotrifluoride or hexafluoroxylene, ketones, esters and ethers such as acetone, methyl isobutyl ketone, ethyl acetate and higher homologs, dialkyl ethers, tetrahydrofuran, ethylene glycol monomethyl or monoethyl ether, ethylene glycol dimethyl or diethyl ether, and mixtures of these ketones, esters or ethers with water. If one of the components (i.e. hydrogen sulfide, mercaptan or solvent) boils below the reaction temperature, the reaction is desirably carried out in a pressure tube or an autoclave.

It is most preferable for economic reasons to carry out the addition reactions in that solvent from which the adduct will be applied to a substrate such as textile, paper, leather and the like or which solvent can be utilized for additional reactions to be carried out with the adduct.

The addition reaction is very simple to carry out, i.e. the mercaptan IV, the di- or triester III are dissolved at the desired molar ratios in a solvent described above and the catalyst (0.01–2%) is added. The reaction mixture is kept at a temperature ranging from room temperature to 100°C, preferably under nitrogen until the disappearance of the double bond of the ester III indicates that the reaction is complete. Other means of following the reaction are GC (gas chromatography), titration of free mercapto groups or TLC (thin layer chromatography). Required reaction times depend on reaction temperatures and amounts and kind of catalysts employed and may range from 5 minutes to 24 hours. To obtain products free of discoloration it is preferred to work at reaction temperatures below 70°C, preferably 40° to 60°C. If required, the addition product can be isolated by evaporating the solvent and catalyst (low volatile catalysts such as triethylamine are preferred) and be purified employing crystallization, precipitation or distillation procedures.

The synthesis method for the novel compounds as described earlier is usually the preferred one. It is however possible to obtain the same products by adding hydrogen sulfide or mercaptans of type IV to the free α, β-unsaturated di- and tri-acids and carrying out the esterification as a last step as the following specific example shows:

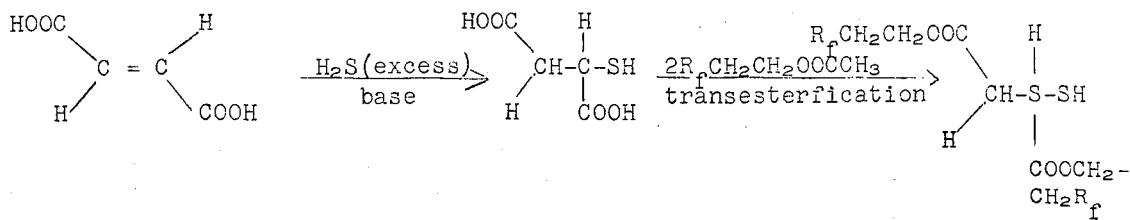

Free mercapto group containing adducts of type I or Ia are of special interest as chain transfer agents in the free radical polymerization of vinyl and related monomers. By acting as chain transfer agents in the manner of all mercaptan, adducts of type I, Ia are incorporated into the polymer chain. This use of the disclosed novel mercaptans is found in FCR-25.

The novel adducts are useful in many ways:

They can be applied to substrates such as textiles, paper, leather, wood, metallic surfaces and the like providing oil and water repellency to the treated substrates at extremely low add-ons. As shown in the examples, good repellency ratings are obtained with as little fluorine as 0.04 to 0.12% by weight of the substrate. Besides oil and water repellency, the adducts show excellent fastness properties such as wash and dryclean fastness, abrasion resistance and good drysoiling properties. This is especially true in the case of adducts of type I having free mercapto groups which are, in many cases, able to react with the substrate or extenders. The novel adduct may be applied to the various substrates by various coating techniques, such as dipping, spraying, brushing, padding, roll coating, and the like.

The adduct can be applied from a solvent and preferably from a solvent in which it was prepared for economical reasons.

The adducts may also be applied from an aqueous system if either the adduct solution is water miscible or the adduct solution has been postemulsified, employing emulsifiers and emulsification techniques known in the art. It is understood that the novel adducts can be applied in combination with other finishes such as extenders, softeners, hand builders, permanent press resins, catalysts and the like.

Besides being useful per se as soil repellent finishes, which are correlated to oil and water repellency, the novel adducts of type I are of interest as intermediates for the synthesis of novel $R_f$-group containing polymers and addition or condensation products.

Since the novel adducts have little or no film-forming properties it is advantageous to apply them to substrates in combination with film-forming polymers or copolymers, as used for instance, for textile pigment printing and textile finishing in general. If the novel adducts are applied from a solvent, then the polymeric extenders are dissolved in the same or a compatible solvent and co-applied to the substrate. In the case where a post-emulsified adduct-solution is applied from an aqueous medium, the preferred extenders are aqueous polymer dispersions which are miscible with the post-emulsified adduct-solutions.

Polymers useful for such blends, include for example, but without limitation, polymers and copolymers of alkyl arcylates and alkyl methacrylates, such as methyl methacylate, ethyl methacrylate, isobutyl methacrylate, hexyl methacrylate, and n-octyl methacrylate. Particularly suitable polymers are poly(methyl methacrylate), poly(isobutyl methacrylate) and poly(n-octyl methacrylate). Also useful are polymers and copolymers of acrylic acid, methacrylic acid, styrene, alkyl styrene, butadiene, 2-methyl-1,3-butadiene, 2-chloro-1,3-butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like;

polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, acrylonitrile and methacrylonitrile.

For example, from about 20 to 97% by weight of poly(methyl methacrylate) blended with the polymer composition of this invention provides very useful coating compositions which retain surprisingly high repellency ratings even though the relative amount of fluorinated polymer is very low.

A preferred class of extender polymers for the dispersion polymers of the present invention, particularly for textile applications, is disclosed in U.S. Pat. No. 3,349,054. These extender polymers give soft finishes that are light stable and help to impart excellent wash-and-dry clean fastness to finishes derived from adducts described in this invention.

Of course, it is understood that besides application to textiles, the coatings of the fluorinated polymer compositions of the present invention are useful in providing oil and water repellent coatings for leather, paper, wood, masonry, metals, plastics, glass, painted surfaces, and the like. A very significant advantage of the polymer compositions of the present invention is that they form effective oil repellent coatings at relatively very low fluorine levels on the substrate. In other words, on a given weight basis, the fluorine content of the polymer compositions of this invention exhibits more effective repellent properties than the same level of fluorine in other polymer compositions previously utilized in the art.

A further advantage of the polymer compositions of this invention is that they may not require a separate curing or heating step, but can provide excellent repellent properties after drying in air.

ADDUCT SYNTHESIS

Mercaptans employed for the synthesis of Adduct I of the present invention are listed in the following Table 1. They are all commercially available with the exception of the 1,1,2,2-tetrahydroperfluorodecyl mercaptan, which was prepared using a procedure as described in U.S. Pat. No. 3,544,663.

$R_f$-esters of type III used for the adduct syntheses are tabulated in Table 2.

Table 1

Mercaptans employed for the Adduct Synthesis

| Name | Structure | Source |
|---|---|---|
| n-Octyl mercaptan | $CH_3(CH_2)_7SH$ | Humphrey Chemical Co. |
| n-Octadecyl mercaptan | $CH_3(CH_2)_{17}SH$ | " |
| 1,1,2,2-Tetrahydroperfluorodecyl mercaptan | $CF_3(CF_2)_7CH_2CH_2SH$ | Prepared according US 3,544,663 |
| Triphenylmethyl mercaptan | $(C_6H_5)_3CSH$ | Aldrich |
| Tetramethylene dimercaptan | $HS(CH_2)_4SH$ | " |
| Glycol dimercaptopropionate | $-(-CH_2OOCCH_2CH_2SH)_2$ | Evans Chemetics, Inc. |
| Trimethylolethane tri(3-mercaptopropionate) | $CH_3C(CH_2OOCCH_2CH_2SH)_3$ | " |
| Pentaerythritol tetra-(3-mercaptopropionate) | $C(CH_2OOCCH_2CH_2SH)_4$ | " |
| Dipentaerythritol hexa(3-mercaptopropionate) | $-O[-CH_2C(CH_2OOCCH_2CH_2SH)_3]_2$ | " |
| Tripentaerythritol octa(3-mercaptopropionate) | $C+CH_2OCH_2C(CH_2OOCCH_2CH_2SH)_3]_2$ $L(CH_2OOCCH_2CH_2SH)_2$ | " |

Table 2

$R_f$-esters of type III employed for the Adduct Synthesis

| Example | Name | Structure | Ref. |
|---|---|---|---|
| A | Bis(1,1-dihydroperfluorooctyl) fumarate, mp. 80–82.5°C | $+CHCOOCH_2C_7F_{15})_2$, trans, | Ser.No. 720,390 Ex. 2 |
| B | Bis(1,1,2,2-tetrahydroperfluorodecyl) fumarate, mp. 81–83.5°C | $+CHCOOCH_2CH_2C_8F_{17})_2$, trans | Ser.No. 720,370 |
| C | Bis(1,1,2,2-tetrahydroperfluoroalkyl) fumarate, see table 2(b) | $+CHCOOCH_2CH_2R_f)_2$, trans $R_f = -C_6F_{13}$, $-C_8F_{17}, -C_{10}F_{21}$, | Ser.No. 720,370 |
| D | Bis(1,1-dihydroperfluorooctyl) itaconate, bp.128–131°C at 0.1mm | $CH_2=C(CH_2COOCH_2C_7F_{15})-$ $COOCH_2C_7F_{15}$ | Ser.No. 720,370 Ex. 8 |
| E | Bis(1,1,2,2-tetrahydroperfluorononyl) thiofumarate mp. 137.5–139°C | $+CHCOSCH_2CH_2C_7F_{15})_2$, trans | Ser.No. 720,370 Ex. 6 |
| F | Bis[4-(perfluoroheptyl)-3-butenyl] fumarate, bp. 182° at 0.4mm | $+CHCOOCH_2CH_2CH=CHC_7F_{15})_2$, trans | CIP/GC 309 FCR-27 |
| G | Bis[11-perfluoroheptyl)-10-undecenyl] fumarate, mp. 37.5–38.5 | $+CHCOO(CH_2)_9CH=CHC_7F_{15}]$, trans | CIP/GC 309 FCR-27 |
| H | Bis[6-(perfluoroheptyl)-3-oxa-5-hexenyl] itaconate, bp. 208–216 at 0.8mm | $CH_2=CCOOCH_2CH_2OCH_2CH=CH_7F_{15}$ $CH_2COOCH_2CH_2OCH_2CH=CHC_7F_{15}$ | CIP/GC 309 FCR-27 |
| I | Bis[6-perfluorooctyl)-4-thiahexyl] fumarate, mp. 81–83°C | $+CHCOOCH_2CH_2CH_2SCH_2CH_2C_8F_{17})_2$, trans | CIP/GC 309 FCR-26 |
| J | Bis[11-(perfluoroisopropyl)-10-undecenyl] fumarate, bp. 228°C at 0.5 mm | $+CHCOO(CH_2)_9CH=CHCF(CF_3)_2]_2$, trans | CIP/GC 309 FCR-27 |
| K | Bis(4-perfluoroisopropoxy-1,1,2,2-tetrahydroperfluorobutyl) fumarate, bp. 110°C at 0.2mm | $+CHCOOCH_2CH_2CF_2OCF(CF_3)_2]_2$, trans | CIP/GC 309 FCR-27 |
| L | Bis[2-(n-perfluorooctanamido)ethyl] fumarate, mp. 151–152.5°C | $+CHCOOCH_2CH_2NHCOC_7F_{15})_2$, trans | Ser.No. 732,040 Ex. 1 |
| M | Bis[2-(n-perfluorooctanamido)ethyl] thiofumarate, mp. 195–197°C | $+CHCOSCH_2CH_2NHCOC_7F_{15})_2$, trans | Ser.No. 732,040 Ex. 5 |
| N | Bis[2-(N-ethyl-n-perfluorooctanesulfonamido)ethyl] itaconate mp. 99.5–100.5°C | $CH_2=CCOOCH_2CH_2N(C_2H_5)SO_2C_8F_{17}$ $CH_2COOCH_2CH_2N(C_2H_5)SO_2C_8F_{17}$ | Ser.No. 812,349 Ex. 5 |
| O | Bis[2-(N-ethyl-n-perfluorooctanesulfonamido)ethyl] fumarate mp. 112–112.5°C | $+CHCOOCH_2CH_2N(C_2H_5)SO_2C_8F_{17}]_2$, trans | Ser.No. 812,349 Ex. 1 |
| P | Bis(N-1,1-dihydroperfluorooctyl) itaconamide, mp.142–143°C | $CH_2=CCONCH_2C_7F_{15}$ $CH_2CONCH_2C_7F_{15}$ | Ser.No. 820,647 Ex. 5 |

Table 2-b

Composition and Analysis of $R_f$-fumarate Example C

The $R_f$-fumarate mixture of the type $+CHCOOCH_2CH_2R_f)_2$, trans, derived from a mixture of $R_fCH_2CH_2I$, where $R_f = -C_6F_{13}, -C_8F_{17}$ and $-C_{10}F_{21}$, is an off-white wax, and has the following composition according to VPC analysis:

Diester-Content:

| | | |
|---|---|---|
| $C_{12}$-diester : | 3.5% | $(= -C_6F_{13} + -C_6F_{13})$ |
| $C_{14}$-diester : | 21.7% | $(= -C_6F_{13} + -C_8F_{17})$ |
| $C_{16}$-diester : | 38.8% | $(= -C_6F_{13} + -C_{10}F_{21}$ and $-C_8F_{17} + -C_8F_{17})$ |
| $C_{18}$-diester : | 27.6% | $(= -C_8F_{17} + -C_{10}F_{21})$ |
| $C_{20}$-diester : | 8.0% | $(= -C_{10}F_{21} + -C_{10}F_{21})$ |
| Unknowns | 0.4% | |

Average Mol. Weight : 987.3
Fluorine Content : 63.91%
Boiling Range : 150 to 220°C at 0.01 mm Hg
Melting Range : 66 to 75°C

EXAMPLE 1

Bis(1,1-dihydroperfluorooctyl)(octadecylthio)succinate,

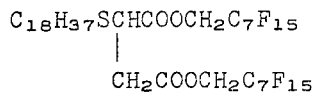

Bis(1,1-dihydroperfluorooctyl) fumarate (4.4g, 0.005 mole, Example A), n-octadecyl mercaptan (1.43 g, 0.005 mole, Aldrich), triethylamine (0.06g), and chloroform (24g) were charged into a reaction flask and stirred for 18 hours at 55°C, after which time TLC-analysis showed complete reaction. The solvent was stripped off in a rotary evaporator and the residue crystallized twice from an acetone-methanol mixture yielding 5.1g (88% yield) of white, flake-like crystals with a mp of 42°–43°C. The NMR showed proton resonances at $\delta 0.85$, 3 protons in an apparent singlet, $\underline{CH_3}$–$(CH_2)_{17}$; $\delta 1.25$, 32 protons in a multiplet, $+CH_2CH_2)_8$; $\delta 2.5$–3.15, 4 protons in overlapping multiplets, $C_{17}H_{35}\underline{CH_2}SCH$–$(\underline{CH_2}$–)COO–; $\delta 3.7$, 1 proton in a doublet of doublets, S–$\underline{CH}CH_2$; $\delta 4.6$, 4 protons in a triplet $+O\underline{CH_2}CF_2)X2$. TLC analysis showed the adduct to be pure (one spot) and NMR, IR and elemental analysis was consistent for the structure.

Analysis for $C_{38}H_{44}F_{30}O_4S$: Calc. : C, 39.11; H, 3.80; F, 48.85; S, 2.75
Found : C, 39.21; H, 3.82; F, 48.30; S, 2.99

EXAMPLE 2

Bis(1,1,2,2-tetrahydroperfluorodecyl)(octylthio)succinate,

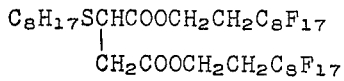

Bis(1,1,2,2-tetrahydroperfluorodecyl) fumarate (3.024g, 0.003 mole, Example B), n-octyl mercaptan (0.438; 0.003 mole, Aldrich), triethylamine (0.03g) and methyl chloroform (10g) were sealed in an ampul under nitrogen and kept for 16 hours at 60°C. On cooling, a precipitate formed. The white crystalline material (1.0g, mp 92°–94°C) which was recovered by filtration was unreacted bis(1,1,2,2-tetrahydroperfluorodecyl) fumarate. The filtrate was stripped of the solvent on a rotary film evaporator and the oily residue, which solidified on standing was redissolved in benzene and was passed through a column of 6g of neutral aluminum oxide (activity I). The first 10 ml portion of benzene wash contained unreacted octyl mercaptan. The desired product was obtained in the following 50 ml portion of benzene wash. The benzene was stripped off and the product was crystallized from hexane. The purified white crystalline product (0.7g) possessed a mp of 40°–41°C.

The NMR spectrum showed proton resonances at $\delta 0.9$, 3 protons in an apparent singlet, $\underline{CH_3}$–$(CH_2)_7$–; $\delta 1.1$ – 1.85, 12 protons in a broad resonance, $+CH_2)_6$; $\delta 2.1$ – 3.0, 8 protons in overlapping multiplets, –CH$_2$–$\underline{CH_2}$S–CH($\underline{CH_2}$COOCH$_2$$\underline{CH_2}$C$_8$F$_{17}$)–COOCH$_2$$\underline{CH_2}$C$_8$F$_{17}$; $\delta 3.62$, 1 proton in a doublet of doublets, S$\underline{CH}$(CH$_2$)COO; $\delta 4.4$, 4 protons in overlapping triplets, $+O\underline{CH_2}CH_2)X2$.

These data are consistent with the structure of the adduct.

Analysis for $C_{32}H_{28}F_{34}O_4S$:
Calc: C, 33.29; H, 2.44; F, 55.95; S, 2.78
Found: C, 33.25; H, 2.35; F, 55.36; S, 2.78

EXAMPLE 3

Bis(1,1,2,2-tetrahydroperfluorodecyl)(1,1,2,2-tetrahydroperfluorodecylthio)succinate,

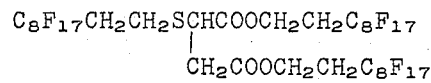

Bis(1,1,2,2-tetrahydroperfluorodecyl) fumarate (2.016g, 0.002 mole, Example B), 1,1,2,2-tetrahydroperfluorodecyl mercaptan (0.960g, 0.002 mole), triethylamine (0.03g) and methyl chloroform (8.2g) were sealed in an ampul under nitrogen and kept at 60°C for 7 hours. After cooling, the adduct precipitated, was filtered and recrystallized from methyl chloroform. A total of 2.3g (77% yield) of pure, white crystals with a mp of 69°–69.5°C were obtained The NMR showed proton resonances at $\delta 2.1$–3.2, 10 protons in unresolved overlapping signals, $C_8F_{17}\underline{CH_2}\underline{CH_2}SCH(\underline{CH_2}COOCH_2\underline{CH_2}C_8F_{17})$–$COOCH_2\underline{CH_2}C_8F_{17}$; $\delta 3.75$, one proton in a doublet of doublets, S–CHCOO; $\delta 4.5$, 4 protons in a triplet, $2X(COO\underline{CH_2}$–CH$_2$).

These data are consistent with the structure of the adduct.

Analysis for $C_{34}H_{15}F_{51}O_4S$:
Calc.: C, 27.43; H, 1.02; F, 65.10
Found : C, 27.50; H, 1.09; F, 65.95

EXAMPLE 4

Bis[6-(perfluorooctyl)-4-thiahexyl] (1,1,2,2-tetrahydroperfluorodecylthio)succinate,

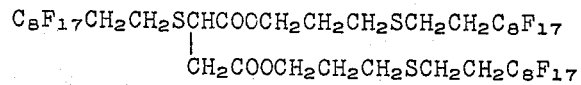

Bis[6-(perfluorooctyl)-4-thiahexyl] fumarate (2.313g; 0.002 mole, Example I), 1,1,2,2-tetrahydroperfluorodecyl mercaptan (0.960g; 0.002 mole), triethylamine (0.6g) and methyl chloroform (10g) were sealed in an ampul under nitrogen and kept at 60°C for 16 hours. The solvent was stripped off and the residue was crystallized twice from benzene, yielding 2.9g (89% yield) of white crystals, mp of 69°–69.5°C. The NMR showed proton resonances at $\delta 1.66$–3.1, 22 protons in complex overlapping signals, $C_8F_{17}\underline{CH_2}\underline{CH_2}$-SCH[$\underline{CH_2}$COOCH$_1$($\underline{CH_2}$)$_2$–S(CH$_2$)$_2$–C$_8$F$_{17}$]COOCH$_2$($\underline{CH_2}$)$_2$S($\underline{CH_2}$)$_2$C$_8$F$_{17}$; $\delta 3.69$, one proton in a doublet of doublets, –SCHCOO; $\delta 4.22$, 4 protons on overlapping triplets, $2X(COO\underline{CH_2}CH_2)$.

These data are consistent with the structure of the adduct.

Analysis for $C_{40}H_{27}F_{51}O_4S_3$:

Calc.: C, 29.35; H, 1.66; F, 59.20
Found: C, 29.24; H, 1.73; F, 59.86

EXAMPLE 5

Bis[11-(perfluoroisopropyl)-10-undecenyl] (1,1,2,2-tetrahydroperfluorodecylthio)succinate,

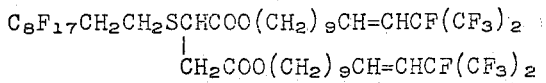

Bis[11-(perfluoroisopropyl)-10-undecenyl] fumarate (1.513g, 0.002 mole, Example J), 1,1,2,2-tetrahydroperfluorodecyl mercaptan (0.960g, 0.002 mole), triethylamine (0.06g) and methyl chloroform (10g) were sealed in an ampul under nitrogen. The ampul was then heated at 60°C for 16 hours. The pale yellow solution was then stripped of solvent and the residual oil was redissolved in benzene. The solution was passed through a column of 6g of neutral aluminum oxide (activity I). The first 50 ml from the column were collected and were stripped of benzene. The product was obtained as a yellow oil (1.9g) in a 77% yield. A VPC check showed the product to be free of starting materials. The NMR showed proton resonances at $\delta 1.25$, 28 protons in a singlet, $-(CH_2-)_7 X2$; $\delta 1.8-3.1$, 10 protons in unresolved overlapping signals, $C_8F_{17}\underline{CH_2}CH_2S$-CH[$\underline{CH_2}COOCH_2(CH_2)_7\underline{CH_2}CH=CH-$];
$COOCH_2(CH_2)_7 -\underline{CH_2}CH=CH$; $\delta 3.64$, 1 proton in a doublet of doublets, $-S\underline{CH}(CH_2-)COO-$; $\delta 4.1$, 4 protons in overlapping triplets, $-O\underline{CH_2}CH_2-$ X2; $\delta 5.4$, 2 protons in undetermined broad signals $-CH=\underline{CH}CF-$ X2; $\delta 6.32$, 2 protons in triplets of a doublet; $-CH_2\underline{CH}=CH-CF-$ X2.

These data are consistent with the structure of the adduct.

Analysis for $C_{42}H_{47}F_{31}O_4S$:

Calc.: C, 40.78; H, 3.83; F, 47.62
Found: C, 40.57; H, 3.69; F, 47.47

EXAMPLE 6

Bis(1,1,2,2-tetrahydroperfluoroalkyl) (octadecylthio)succinate,

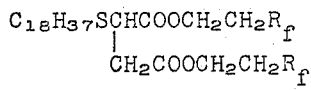

Bis(1,1,2,2-tetrahydroperfluoroalkyl) fumarate (39.48g; 0.04 mole, Example C), n-octadecyl mercaptan (12.87g; 0.04 mole, Aldrich), triethylamine (0.25g) and tetrahydrofuran (200g) were charged into a reaction flask and kept at 70°C for 72 hours after which time conversion was complete according to IR analysis. The solvent was then stripped off and the adduct purified by precipitating the adduct-benzene solution into twenty times an excess of methanol and 43.7g (84.4% yield) of a white powder, mp 59°–61°C was obtained. The fluorine analysis obtained indicated that the composition of the different $R_f$-esters did not change in the adduct.

Analysis for

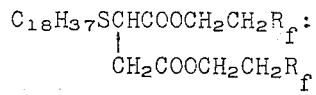

Calc.*: F, 49.50
Found: F, 50.59
*Calculated from F-content of $R_f$-fumarate, Example C

EXAMPLE 7

Bis(1,1,2,2,-tetrahydroperfluorodecyl) mercaptosuccinate,

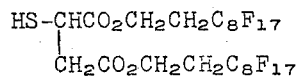

Thiomalic acid (1.2g, 0.008 moles); 1,1,2,2,-tetrahydroperfluorodecyl acetate (12.65g, 0.0025 moles), and p-toluenesulfonic acid monohydrate (0.2g) were magnetically stirred and heated to 175°–185° in a nitrogen stream for 22 hours. Acetic acid was removed in a Dean-Stark trap and confirmed by infra-red analysis. The reaction product was worked up by preliminary distillation in a Hickman molecular still at ~200°/.005 mm. followed by two recrystallizations from methyl chloroform, yielding white crystals with a mp of 68.0°–68.7°. The NMR confirmed the postulated structure and showed proton resonances at $\delta 2.2$, 1 proton, SH; $\delta 1.6-3.1$, 6 protons, undetermined multiplicity, $2\underline{CH_2}R_f$, + $\underline{CH_2}CO$; $\delta 3.75$, 1 proton, multiplet, SH—$\underline{CH}$; $\delta 4.4$, 4 protons, multiplet,

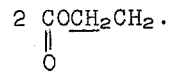

Analysis for $C_{24}H_{12}F_{34}O_4S$:

Calc.: C, 27.69; H, 1.16; F, 61.97
Found: C, 28.06; H, 1.18; F, 61.99

EXAMPLE 8

Bis(1,1,2,2,-tetrahydroperfluorodecyl) (triphenylmethylthio)-succinate,

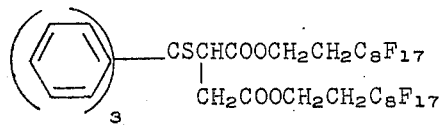

Bis(1,1,2,2,-tetrahydroperfluorodecyl) fumarate (2.52g, 0.0025 mole, Example B), triphenylmethyl mercaptan (0.692g, 0.0025 mole), triethylamine (0.06g) and methyl chloroform (10g) were sealed in an ampul under nitrogen. The ampul was heated at 70°C for 24 hours. On cooling, a precipitate immediately formed and was filtered yielding 0.5g of a solid which melted from 90°–130°C. It appeared to be composed mostly of unreacted bis(1,1,2,2-tetrahydroperfluorodecyl) fumarate. The filtrate was then stripped of solvent and the residue was crystallized twice from heptane. The purified product (0.9g) was obtained as white crystals, with a mp of 62°–63.5°C. A TLC check showed a single spot for the product. The NMR showed proton resonances at $\delta 1.5$–2.2, 2 protons in the apparent 8 line AM pattern of an AMX system (12 lines-see $\delta 3.22$), —SCH$\underline{CH}_2$—; $\delta 2.2$–2.85, 4 protons in an unresolved pattern $+CH_2\underline{CH}_2C_8F_{17}+X2$; $\delta 3.22$, 1 proton in a doublet of doublets, —S$\underline{CH}$—CH$_2$—; $\delta 4.25$, 4 protons in overlapping triplets, $+O\underline{CH}_2CH_2)X2$; $\delta 7.0$–7.65, 15 protons in a complex pattern, (C$_6$H$_5$+X3.

A trace impurity was evident at $\delta 6.8$, due to unreacted $+COC\underline{CH}=\underline{CH}COO+$:

These data are consistent with the structure of the adduct.

Analysis for C$_{43}$H$_{26}$F$_{34}$O$_4$S:
Calc.: C, 40.20; H, 2.04; F, 50.28
Found: C, 39.32; H, 2.14; F, 53.91

EXAMPLE 9

Bis[2-(N-ethyl-perfluorooctanesulfonamido)ethyl] (1,1,2,2-tetrahydroperfluorodecylthio)succinate,

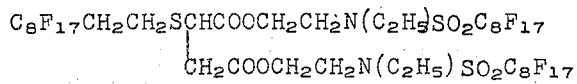

Bis[2-(N-ethyl-perfluorooctanesulfonamido)ethyl] fumarate (2.445g, 0.002 mole, Example D), 1,1,2,2-tetrahydroperfluorodecyl mercaptan (0.960g, 0.002 mole), triethylamine (0.06g), and methyl chloroform (10g) were sealed in an ampul under nitrogen. The ampul was heated at 60°C for 24 hours. A crystalline product formed in cooling; this was filtered and triturated with chloroform. One gram of a mp of 106°–108° was recovered. The mother liquor was evaporated and the residue crystallized from a solvent mixture of 3 parts of hexane and 1 part of chloroform. One gram of a white crystalline product was isolated having a mp of 77°–81°C. A TLC analysis showed the product to contain a trace impurity. The NMR showed proton resonances of $\delta 1.25$, 6 protons in a triplet, —NCH$_2\underline{CH}_3$; $\delta 1.6$–40, 15 protons in unresolved and overlapping signals, C$_8$F$_{17}\underline{CH_2CH_2}$S$\underline{CH}[\underline{CH}_2COOCH_2\underline{CH}_2N(\underline{CH}_2CH_3$)SO$_2$—COOCH$_2\underline{CH}_2$ N($\underline{CH}_2$CH$_3$)SO$_2$—; $\delta 4.25$, 4 protons in overlapping triplets, $+O\underline{CH}_2CH_2)X2$.

These data are consistent with the structure of the adduct.

Analysis for C$_{38}$H$_{25}$F$_{51}$N$_2$O$_8$S$_3$:
Calc.: C, 26.80; H, 1.48; F, 56.91; N, 1.65
Found: C, 26.89; H, 1.52; F, 56.27; N, 1.73

EXAMPLE 10

Tetrakis(1,1,2,2-tetrahydroperfluorodecyl) (tetramethylenebisthio)disuccinate,

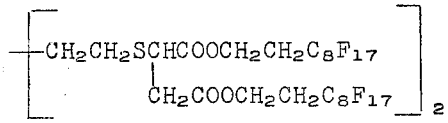

Bis(1,1,2,2-tetrahydroperfluorodecyl) fumarate (3.024g, 0.003 mole, Example B), butanedithiol (0.183g, 0.0015 mole), triethylamine (0.1g) and methyl chloroform (10g) were sealed in an ampul under nitrogen. the ampul was then heated at 70°C for 24 hours. The solvent was then evaporated and the wax-like residue was crystallized from a mixture of hexane and acetone. The product was obtained as a white powder having a mp of 60°–61°C in 75% yield (2.42g). A small fraction of this was recrystallized from the hexane-acetone mixture to a mp of 60°–61°C. A TLC analysis showed the product to be a single component. The NMR showed proton resonances at $\delta 1.5$–1.85, 4 protons in broad singlet, —CH$_2$($\underline{CH}_2$)$_2$CH$_2$—; $\delta 2.0$–3.0, 16 protons in unresolved, overlapping multiplets, $+\underline{CH_2C}$-H$_2$SCH($\underline{CH}_2$COOCH$_2\underline{CH}_2$C$_8$F$_{17}$)COOCH$_2\underline{CH}_2$C$_8$F$_{17}]_2$: $\delta 3.63$, 2 protons in a doublet of doublets, (S$\underline{CH}$CH$_2$)X2; $\delta 4.4$, 8 protons in overlapping triplets $+O\underline{CH}$ 2CH$_2$)X4.

These data are consistent with the structure of the adduct.

Analysis for C$_{52}$H$_{30}$F$_{68}$O$_8$S$_2$:
Calc.: C, 29.20; H, 1.41; F, 60.41
Found: C, 29.19; H, 1.42; F, 60.67

EXAMPLE 11

Tetrakis(1,1,2,2-tetrahydroperfluorodecyl) [thiobis (ethylenethio)]disuccinate,

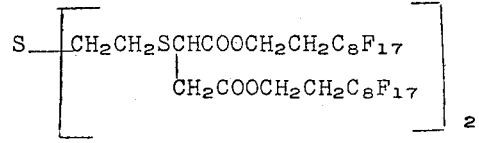

Bis(1,1,2,2-tetrahydroperfluorodecyl) fumarate (4.032g, 0.004 mole, Example B), 2,2-thiodiethanethiol (0.309g, 0.002 mole), benzyl trimethylammonium hydroxide [0.05g (Triton B, 35% in methanol)], and methyl chloroform (15g) were sealed in an ampul under nitrogen. The ampul was heated at 60°C for 24 hours. The solvent was then evaporated and the residue was dissolved in hot hexane. An orange oil separated almost immediately. The still-warm hexane layer was decanted and allowed to cool further. A white crystalline product formed which was filtered, then slurried with warm chloroform. The insoluble material which was isolated, was unreacted bis(1,1,2,2-tetrahydroperfluorodecyl) fumarate (mp 92°–95°C, 0.6g). The filtrate was concentrated and diluted with hot hexane. On cooling 1.35g of product, mp 64°–66.5°C, crystallized and was filtered. The white powder was pure (one spot) by TLC analysis. The orange oil, which had solidified in the meantime, was then heated with 2g of acetone and 5g of hexane. An oil layer remained; the solvents were decanted, cooled and 0.4g of a white powder (mp 67°–71°C) separated. A TLC analysis showed this to be the same as the previously isolated product (mp 64°–66.5°C). A total of 1.75g of product was isolated. The NMR showed proton resonances at $\delta 1.8$–3.1, 20 protons in unresolved signals, $+S\underline{CH_2CH_2}SCH(\underline{CH}_2COOCH_2$—$\underline{CH}_2C_8F_{17})COOCH_2\underline{CH}_2C_8F_{17}]_2$; $\delta 3.69$, 2 protons in a doublet of doublets, (S$\underline{CH}$CH$_2$)X2; $\delta 4.36$; 8 protons in overlapping multiplets $+O\underline{CH}_2CH_2)X4$. A trace impurity was evident at $\delta 6.8$, due to unreacted —OOC$\underline{CH}$=$\underline{CH}$COO—.

These data are consistent for the structure of the adduct.

Analysis for $C_{52}H_{30}F_{68}O_8S_3$:
    Calc.: C, 28.77; H, 1.39; F, 59.51
    Found: C, 28.59; H, 1.27; F, 60.22

EXAMPLE 12

Tetrakis(1,1,2,2-tetrahydroperfluorodecyl) [ethylenebis (oxycarboxylethylenethio)]disuccinate,

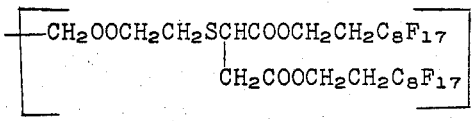

Bis(1,1,2,2-tetrahydroperfluorodecyl) fumarate (4.8g, 0.0048 mole, Example B), glycol di(3-mercaptopropionate) b.p. ~144/ 1 mm (0.57g, 0.0024 mole, Evans Chemetics Inc.), triethylamine (0.027g), and methylene chloride (10g) were charged into a pressure bottle and agitated for 16 hours at 50°C. Infrared analysis indicated no residual fumarate unsaturation and the solvent was stripped off in a rotary evaporator. The residue was crystallized three times from methyl chloroform (70% yield) to yield white crystals with a mp of 69.4°–70.1°C. The NMR showed proton resonances at δ2.0–3.3, 20 protons, undetermined multiplicity,

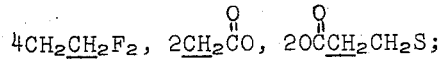

δ3.35–3.9, 2 protons, doublet of doublets,

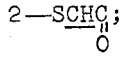

δ4.15–4.65, 12 protons, undetermined multiplicity,

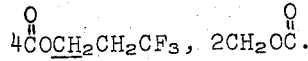

These data are consistent for the postulated structure.

Analysis for $C_{56}H_{34}F_{68}O_{12}S_2$:
    Calc.: C, 29.56; H, 1.51; F, 56.79
    Found: C, 29.68; H, 1.48; F, 57.81

EXAMPLE 13

Hexakis(1,1,2,2-tetrahydroperfluorodecyl) [ethylidynetris (methyleneoxycarbonylethylenethio)]-trisuccinate,

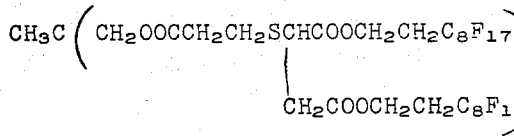

Bis(1,1,2,2-tetrahydroperfluorodecyl) fumarate (4.84g, .0048 moles, Example B), trimethylolethane tri(3-mercaptopropionate) (0.62g, .0016 moles), and triethylamine (0.03g) are dissolved in 10g of methylene chloride and reacted under nitrogen for 16 hours at 50° in a pressure bottle. Additional methylene chloride (20g) is added to facilitate transfer and the solution is cooled to 0° and filtered. The crystallized tri-adduct weighs 5.3g (96% yield), has a mp of 79°–81°C and shows no residual unsaturation by infrared spectroscopy. It is recrystallized from methyl chloroform to a mp of 81.9°–82.4°C and its purity confirmed by NMR. The compound showed NMR proton resonances at δ1.0, 3 protons, $CH_3C$; δ1.85–3.2 30 protons, undetermined multiplicity 3($C\underline{CH}_2CF_2)_2$, 3—$C\underline{CH}_2CH_2S$, 3 $\underline{CH}_2CO_2$; δ3.65, 3 protons, doublet of doublets, 3CH; δ4.05, 6 protons, singlet, 3 $\underline{CH}_2O_2CCH_2$; δ4.37, 12 protons, multiplet, 3($CO_2\underline{CH}_2CH_2)_2$.

These data are consistent with the postulated structure.

Analysis for $C_{86}H_{54}F_{102}O_{18}S_3$:
    Calc.: C, 30.30; H, 1.60; F, 56.84
    Found: C, 30.24; H, 1.58; F, 58.27

EXAMPLE 14

Octakis(1,1,2,2-tetrahydroperfluorodecyl) [neopentanetetrayltetra (oxycarbonylethylenethio)]tetrasuccinate

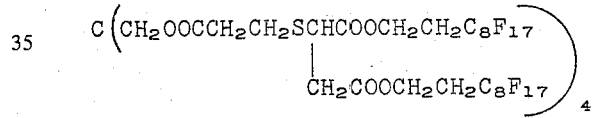

Bis(1,1,2,2-tetrahydroperfluorodecyl) fumarate (0.003 moles Example B), pentaerythritol tetra(3-mercaptopropionate), (0.37g, .0076 moles), and triethylamine (0.02g) are dissolved in 6g methylene chloride and heated under nitrogen for three hours at 50° in a pressure bottle. An additional 30g methylene chloride is then added and the reaction cooled to 0° and filtered. The crude adduct weighs 3.2g, has a mp of approximately 100°C, shows no residual absorption at 1,300–1,310 cm⁻¹ (no unsaturation), and absorbs no iodine. Crystallization two times from 1,1,1-trichloroethane affords an mp of 124.0°–124.6°C.

The NMR confirmed the postulated structure and showed proton resonances at δ1.6–3.4, 40 protons, complex overlapping signals,

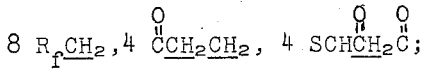

δ3.7, 4 protons, 4 S$\underline{CH}$; δ4.0–4.7, 24 protons, 12 CO$\underline{CH}_2$.

Analysis for $C_{113}H_{68}F_{136}O_{24}S_4$:
    Calc.: C, 30.01; H, 1.51; F, 57.14
    Found: C, 29.93; H, 1.52; F, 57.11

EXAMPLE 15

Addition Products (2/1) of Bis(1,1,2,2tetrahydrofluorodecyl)

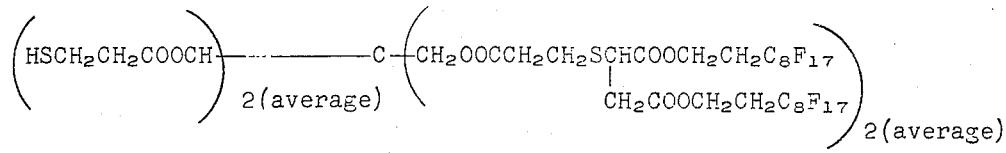

Bis(1,1,2,2-tetrahydroperfluorodecyl) fumarate (20.12g, .02 moles), pentaerythritol tetra(3-mercaptopropionate) (4.88g, .01 moles), and triethylamine (0.13g) are dissolved in 4.5g of methylene chloride and heated at 50° under a nitrogen blanket for 3 hours in a pressure bottle. A mercaptan assay of the solution then indicates 2.4% SH (2.6% theory). The solution is then evaporated on a rotary evaporator to yield a white crystalline residue with residual mercaptan odor.

It was crystallized once from a minimal volume of methyl chloroform, dried and submitted for analysis.

Analysis for $C_{65}H_{48}F_{68}O_{16}S_4$:

Calc.: C, 31.10; H, 1.93; F, 51.6
Found: C, 31.23; H, 1.69; F, 53.0

EXAMPLES 16 – 19

Addition products of Bis(1,1,2,2-tetrahydroperfluoroalkyl) fumarate and Pentaerythritol tetra(3-mercaptopropionate),

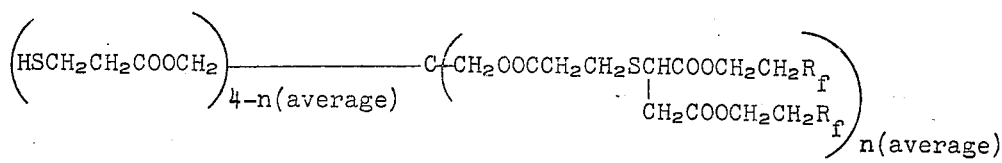

$n = 1, 2, 3,$ or 4

Bis(1,1,2,2-tetrahydroperfluoroalkyl) fumarate (Example C), pentaerythritol tetra(3-mercaptopropionate) in molar ratios as indicated below, 0.5% of triethylamine based on the weight of the reactants and methyl chloroform (4 times the amount of the reactants) were sealed in an ampul under nitrogen and kept for 15 hours at 45°C. After this time, aliquot parts of the reaction mixtures were removed and the free SH-content determined iodimetrically. The titration results and the disappearance of the $R_f$-fumarate double bond at 1,300–1,310 cm$^{-1}$ indicated that the desired mixed adducts were obtained quantitatively. After evaporation of the methyl chloroform, all adducts were obtained as pale yellowish-white waxes which were not further purified.

| Example | n | $R_f$-Fumarate g | moles | Tetra-Mercaptan g | moles | % SH Content calc. | found |
|---------|---|------|-------|------|-------|------|-------|
| 16 | 4 | 10.26, | 0.010 | 1.22, | 0.0025 | 0.0 | 0.04 |
| 17 | 3 | 10.26, | 0.010 | 1.63, | 0.0033 | 0.93 | 0.96 |
| 18 | 2 | 10.26, | 0.010 | 2.44, | 0.005 | 2.60 | 2.68 |
| 19 | 1 | 10.26, | 0.010 | 4.89, | 0.010 | 6.54 | 6.55 |

EXAMPLES 20 – 23

Addition products of Bis(1,1,2,2-tetrahydroperfluoroalkyl) fumarate and Dipentaerythritol hexa(3-mercaptopropionate),

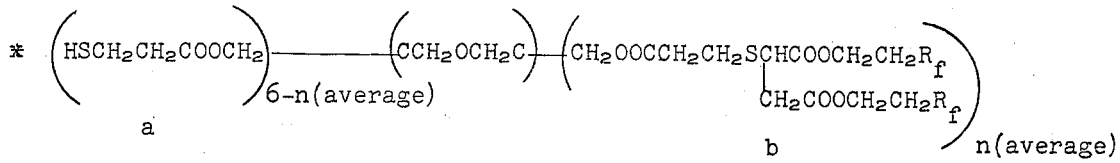

$n = 3, 4, 5$ or 6 *

* The above will only be a structural representation if groups $a$ and $b$ are on the same carbon atoms with the sum of $a$ and $b$ equal to 3 on each appropriate carbon atom.

Bis(1,1,2,2-tetrahydroperfluoroalkyl) fumarate (Example C), dipentaerythritol hexa(3-mercaptopropionate) in molar ratios as indicated below, 1% triethylamine based on the weight of the reactants and methyl chloroform (4 times the weight of the reactants) were sealed in an ampul under nitrogen and kept in a shaker-bath at 50°C for 16 hours. After this time, complete reaction is obtained as evidenced by disappearance of the $R_f$-fumarate ester double bond at 1,300–1,310 cm$^{-1}$ and the SH-content as given below. After evaporation of the solvent, the different adduct mixtures were obtained quantitatively as yellow-white solids with melting points as shown below.

| Example | n | g (moles) of $R_f$-fumarate | g (moles) of hexa mercaptan | SH-content in Adduct calc. | found | Melting Range of Adducts, °C |
|---|---|---|---|---|---|---|
| 20 | 6 | 26.60 (.028) | 3.90 (.0048) | 0 | 0 | 113.3–117.2 |
| 21 | 5 | 26.60 (.028) | 4.50 (.0056) | 0.57 | 0.50 | 100.2–109.5 |
| 22 | 4 | 26.60 (.028) | 5.60 (.0069) | 1.4 | 1.1 | 84.8– 92.8 |
| 23 | 3 | 22.60 (.028) | 7.50 (.0093) | 2.6 | 2.5 | 71.0– 82.0 |

A structural representation drawn from these examples would be

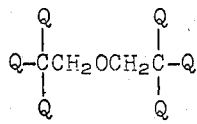

wherein Q is a. —CH$_2$OOCCH$_2$CH$_2$SH or (b) 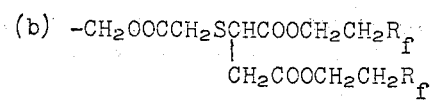

and the sum of (b) totals 3, 4, 5 or 6.

EXAMPLES 24 – 30

Addition products (2 to 1) of $R_f$-Fumarate esters and Pentaerythritol tetra(3-mercaptopropionate),

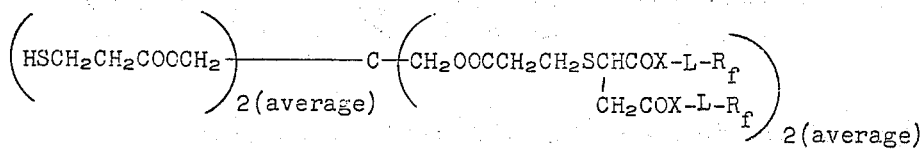

X = oxygen or sulfur, L = linkage group and $R_f$ = perfluoroalkyl group, as shown in Table 3.

$R_f$-fumarates (0.01 mole) as listed in Table 3, pentaerythritol tetra(3-mercaptopropionate) (2.5g, .005 mole), 1% of triethylamine based on the weight of the reactants and 50g of methyl chloroform were sealed in an ampul under nitrogen and kept for 15 hours in a water bath shaker at 60°C. After this time the $R_f$-fumarate double bond at 1,300–1,310 cm$^{-1}$ has disappeared as shown by IR-analysis and the SH-content, determined iodimetrically, dropped to half of the initial value indicating that in all cases the reaction was complete. After evaporation of the methyl chloroform and triethylamine, all 2:1-adducts (average ratio) are obtained as slightly off white waxes or powders, having a faint mercaptan odor.

EXAMPLES 31 – 34

Addition products (2 to 1) of $R_f$-itaconate esters and Pentaerythritol tetra(3-mercaptopropionate)

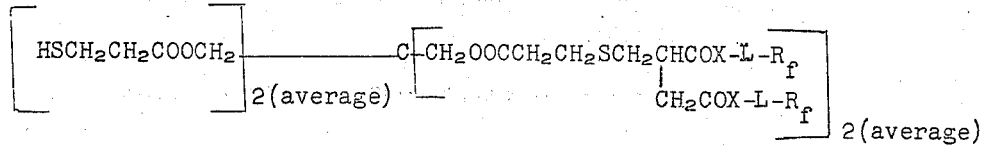

X = oxygen or sulfur, L = linkage group and $R_f$ = perfluoroalkyl group as shown in Table 3.

$R_f$-itaconates (0.01 mole) as listed in Table 4, pentaerythritol tetra(3-mercaptopropionate) (2.5g, 0.005 moles) were reacted as described in the preceding examples 24 – 30. Adducts (2:1 average ratio), as shown in Table 4 are obtained in quantitative yields proven by IR-analysis (complete disappearance of itaconate double bonds) and free SH-content.

All adducts were off-white powders with a faint mercaptan odor requiring no further purification.

TABLE 3

| Example No. | $R_f$-Fumarate | 2:1-Adduct (average) of $R_f$-fumarate and Pentaerythritol tetra(3-mercaptopropionate) |
|---|---|---|
| 24 | =CHCOSCH$_2$CH$_2$C$_7$F$_{15}$]$_2$ — Example E | [HSCH$_2$CH$_2$COOCH$_2$]$_2$—C—[CH$_2$OOCCH$_2$CH$_2$SCHCOSCH$_2$CH$_2$C$_7$F$_{15}$ / CH$_2$COSCH$_2$CH$_2$C$_7$F$_{15}$ ]$_2$ |
| 25 | =CHCOOCH$_2$CH$_2$CH=CHC$_7$F$_{15}$]$_2$ — Example F | [HSCH$_2$CH$_2$COOCH$_2$]$_2$—C—[CH$_2$OOCCH$_2$CH$_2$SCHCOOCH$_2$CH$_2$CH=CHC$_7$F$_{15}$ / CH$_2$COOCH$_2$CH$_2$CH=CHC$_7$F$_{15}$ ]$_2$ |
| 26 | =CHCOO(CH$_2$)$_9$CH=CHC$_7$F$_{15}$]$_2$ — Example G | [HSCH$_2$CH$_2$COOCH$_2$]$_2$—C—[CH$_2$OOCCH$_2$CH$_2$SCHCOO(CH$_2$)$_9$CH=CHC$_7$F$_{15}$ / CH$_2$COO(CH$_2$)$_9$CH=CHC$_7$F$_{15}$ ]$_2$ |
| 27 | =COOCH$_2$CH$_2$CF$_2$CF$_2$OCF(CF$_3$)$_2$]$_2$ — =HSCH$_2$CH$_2$COOCH$_2$]$_2$—C—[CH$_2$OOCCH$_2$CH$_2$SCHOOCH$_2$CH$_2$CF$_2$CF$_2$OCF(CF$_3$)$_2$ / CH$_2$COOCH$_2$CH$_2$CF$_2$CF$_2$OCF(CF$_3$)$_2$ ]$_2$ | |
| | Example K | |
| 28 | =CHCOOCH$_2$CH$_2$NHCOC$_7$F$_{15}$]$_2$ — Example L | [HSCH$_2$CH$_2$COOCH$_2$]$_2$—C—[CH$_2$OOCCH$_2$CH$_2$SCHCOOCH$_2$CH$_2$NHCOC$_7$F$_{15}$ / CH$_2$COOCH$_2$CH$_2$NHCOC$_7$F$_{15}$ ]$_2$ |

TABLE 3 — Continued

| Example No. | $R_f$-Fumarate | 2:1-Adduct (average) of $R_f$ fumarate and Pentaerythritol tetra(3-mercaptopropionate) |
|---|---|---|
| 29 | $\text{=CHCOSCH}_2\text{CH}_2\text{NHCOC}_7\text{F}_{15}]_2$ — Example M | $[\text{HSCH}_2\text{CH}_2\text{COOCH}_2]_2-\text{C}-[\text{CH}_2\text{OOCCH}_2\text{CH}_2\text{SCHCOSCH}_2\text{CH}_2\text{NHCOC}_7\text{F}_{15}$ / $\text{CH}_2\text{COSCH}_2\text{CH}_2\text{NHCOC}_7\text{F}_{15}]_2$ |
| 30 | $\text{=CHCOOCH}_2\text{CH}_2\text{N(C}_2\text{H}_5)\text{SO}_2\text{C}_8\text{F}_{17}]_2$ — Example O | $[\text{HSCH}_2\text{CH}_2\text{COOCH}_2]_2-\text{C}-[\text{CH}_2\text{OOCCH}_2\text{CH}_2\text{SCHCOOCH}_2\text{CH}_2\text{N(C}_2\text{H}_5)\text{SO}_2\text{C}_8\text{F}_{17}$ / $\text{CH}_2\text{COOCH}_2\text{CH}_2\text{N(C}_2\text{H}_5)\text{SO}_2\text{C}_8\text{F}_{17}]_2$ |

TABLE 4

| Example No. | $R_f$-Itaconate | 2:1-Adduct (average) of $R_f$-itaconate and Pentaerythritol tetra(3-mercaptopropionate) |
|---|---|---|
| 31 | $\text{CH}_2\text{=CCOOCH}_2\text{C}_7\text{F}_{15}$ / $\text{CH}_2\text{COOCH}_2\text{C}_7\text{F}_{15}$ — Example D | $[\text{HSCH}_2\text{CH}_2\text{COOCH}_2]_2-\text{C}-[\text{CH}_2\text{OOCCH}_2\text{CH}_2\text{SCH}_2\text{CHCOOCH}_2\text{C}_7\text{F}_{15}$ / $\text{CH}_2\text{COCCH}_2\text{C}_7\text{F}_{15}]_2$ |
| 32 | $\text{CH}_2\text{=CCOOCH}_2\text{CH}_2\text{OCH}_2\text{CH=CHC}_7\text{F}_{15}$ / $\text{CH}_2\text{COOCH}_2\text{CH}_2\text{OCH}_2\text{CH=CHC}_7\text{F}_{15}$ — Example H | $[\text{HSCH}_2\text{CH}_2\text{COOCH}_2]_2-\text{C}-[\text{CH}_2\text{OOCCH}_2\text{CH}_2\text{SCH}_2\text{CHCOOCH}_2\text{CH}_2\text{OCH}_2\text{CH=CHC}_7\text{F}_{15}$ / $\text{CH}_2\text{COOCH}_2\text{CH}_2\text{OCH}_2\text{CH=CHC}_7\text{F}_{15}]_2$ |
| 33 | $\text{CH}_2\text{CCOOCH}_2\text{CH}_2\text{N(C}_2\text{H}_5)\text{SO}_2\text{C}_8\text{F}_{17}$ / $\text{CH}_2\text{COOCH}_2\text{CH}_2\text{N(C}_2\text{H}_5)\text{SO}_2\text{C}_8\text{F}_{17}$ — Example N | $[\text{HSCH}_2\text{CH}_2\text{COOCH}_2]_2-\text{C}-[\text{CH}_2\text{OOCCH}_2\text{CH}_2\text{SCH}_2\text{CHCOOCH}_2\text{CH}_2\text{N(C}_2\text{H}_5)\text{SO}_2\text{C}_8\text{F}_{17}$ / $\text{CH}_2\text{COOCH}_2\text{CH}_2\text{N(C}_2\text{H}_5)\text{SO}_2\text{C}_8\text{F}_{17}]_2$ |
| 34 | $\text{CH}_2\text{=CCONCH}_2\text{C}_7\text{F}_{15}$ / $\text{CH}_2\text{CONCH}_2\text{C}_7\text{F}_{15}$ — Example P | $[\text{HSCH}_2\text{CH}_2\text{COOCH}_2]_2-\text{C}-[\text{CH}_2\text{OOCCH}_2\text{CH}_2\text{SCH}_2\text{CHCONCH}_2\text{C}_7\text{F}_{15}$ / $\text{CH}_2\text{CONCH}_2\text{C}_7\text{F}_{15}]_2$ |

EXAMPLE 35

4 to 1 adduct of Bis(1,1,2,2-tetrahydroperfluorodecyl) fumarate and Tripentaerythritol octa(3-mercaptopropionate)

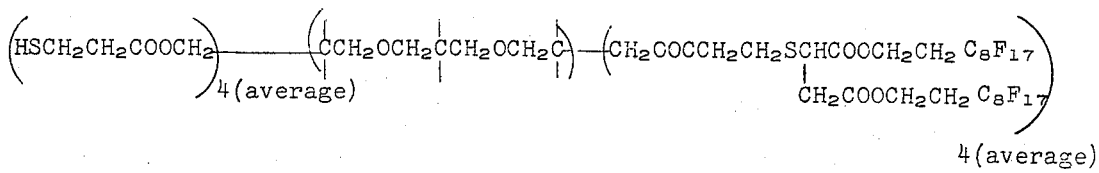

4 (average)

Bis(1,1,2,2-tetrahydroperfluorodecyl) fumarate (25g, 0.025 moles, Example B); tripentaerythritol octa(3-mercaptopropionate), (6.73g, 0.0063 moles) and triethylamine (0.32g) were dissolved in 60g of acetone and sealed under nitrogen in an ampul. After 16 hours in a waterbath shaker at 50°C, the adduct solution was evaporated to dryness to yield a waxy solid with a melting range of 103° to 111°C, having 2.3% free SH-groups (theory 2.55%) determined iodimetrically and no residual fumarate double bonds as shown by IR-analysis.

Analysis for $C_{127}H_{104}F_{120}O_{24}S_8$:
    Calc. : C, 31.72; H, 2.05; F, 50.58
    Found : C, 31.69; H, 2.05; F, 50.97

ADDUCT EVALUATION

In the evaluations carried out in examples 36 to 62, unextended adduct solutions and adduct solutions extended with polymethyl methacrylate to a fluorine content of 20% based on total solids, were applied to cotton and dacron test fabrics by a padding process in such a way to leave 0.04, 0.08, 0.12 and 0.2% fluorine deposited on the fabric. The fabric was evaluated after air drying and after curing in a hot air oven at 150°C for 3 minutes. The use of polymethyl methacrylate is strictly to illustrate the usefulness of a polymeric extender, but other film-forming polymers and textile finishes as listed before could be employed as well.

Cotton and dacron were used as a test fabrics because cotton and dacron are generally most difficult to render oil and water repellent. It is therefore understood that the novel adducts and adduct-blends work as well and better on easier to treat fabrics such as wool, polyamides, polyacrylics, cellulosics and blends of such fabrics.

In the Examples below, the repellency ratings were determined as follows:

The AATCC water spray test rating was determined according to Standard Test Method 22-1966 of the American Association of Textile Chemists and Colorists. Ratings are given from 50 (minimum) to 100 (maximum).

The AATCC Oil Rating was determined according to Standard Test Method 118-1966T of the American Association of Textile Chemists and Colorists. Ratings are given from 1(minimum) to 8(maximum). A commonly accepted level on soil repellent fabrics in the U.S. is an oil repellency of 3 – 4. The soil release properties were determined according to AATCC Standard Test Method 130-1969. Ratings are given from 1(minimum) to 5(maximum).

The drycleaning was carried out according to AATCC Standard Test Method 86-1970.

The home washes were carried out in a Kenmore washing machine, Model 600 at 120°F, employing 45g of the detergent "Tide XK" per washload.

The mentioned AATCC Tests are listed in the Technical Manual of the American Association of Textile Chemists and Colorists, Volume 46, Edition 1970.

EXAMPLES 36 to 51

2% solutions of the adducts of example 1 through 15 and 35 were prepared using the solvents as listed in Table 5. These stock solutions were diluted with methyl chloroform and applied alone or in combination with a solution of polymethyl methacrylate in methyl chloroform to a dacron test fabric in such a way that in each case a total of 0.2% fluorine is deposited onto the fabric. AATCC oil and spray ratings obtained after air drying are listed in Table 5.

EXAMPLES 52 to 55

2% solutions of adducts examples 16 and 17 in methyl chloroform - Freon 113 (2:1) and of adducts examples 18 and 19 in methyl chloroform-acetone (2:1) were applied to cotton alone and in combination with polymethyl methacrylate in such a way that 0.04%, 0.08% and 0.12% of fluorine were deposited onto the fabric, using methyl chloroform as a diluent. AATCC oil and spray ratings obtained are listed in Table 6.

EXAMPLES 56 to 59

10% solutions of the adducts examples 20, 21, 22 and 23 were prepared by dissolving the adducts in solvent mixture of methyl chloroform-acetone -Freon 113 (50:37:13). These solutions were applied to cotton as described in examples 52 to 55 using methyl chloroform as a diluent, and AATCC Oil and Spray ratings were determined as shown in Table 7.

EXAMPLES 60 to 62

Cotton samples which were treated with adducts Examples 16, 17 and 18 according to the procedure of Examples 52, 53 and 58. A total of 0.12% fluorine was obtained based on the weight of fabric. The samples were (a) three times drycleaned or (b) washed three times or (c) submitted to a soil release test according to test specifications, as shown in Table 8. The oil repellency ratings obtained as shown in Table 8 after drycleaning and washing, indicate that the novel adducts show significant fastness even at low fluorine concentrations. The soil release data in Table 8 indicate the novel adducts have good soil release properties.

TABLE 5

| Example No. | Adduct Example No. | Fluorine in Adduct % by wt.[1] | Solvent System | AATCC OIL REPELLENCY | | AATCC WATER REPELLENCY | |
|---|---|---|---|---|---|---|---|
| | | | | 0.2% F | 0.2% F[2] | 0.2% F | 0.2% F[2] |
| 36 | 1 | 48.30 | Methyl Chloroform | 0 | 0 | 50 | 60 |
| 37 | 2 | 55.36 | Methyl Chloroform | 1 | 1 | 60 | 50 |
| 38 | 3 | 65.95 | Methyl Chloroform acetone 2:1 | 1–2 | 2 | 60 | 70 |
| 39 | 4 | 59.86 | Methyl Chloroform | 4–5 | 3 | 70 | 0 |
| 40 | 5 | 47.47 | Methyl Chloroform | 0 | 0 | 50 | 50 |
| 41 | 6 | 50.59 | Methyl Chloroform | 0 | 0 | 70 | 60 |
| 42 | 7 | 61.99 | Methyl Chloroform | 4–5 | 5 | 70 | 60 |
| 43 | 8 | 53.91 | Methyl Chloroform | 1 | 1 | 70 | 70 |
| 44 | 9 | 56.27 | Methyl Chloroform acetone 1:1 | 5 | 5 | 0 | 50 |
| 45 | 10 | 60.68 | Methyl Chloroform | 6 | 5–6 | 90 | 80 |
| 46 | 11 | 60.22 | Methyl Chloroform | 6 | 5–6 | 70 | 80 |
| 47 | 12 | 57.81 | Methyl Chloroform | 6 | 6 | 70 | 60 |
| 48 | 13 | 58.27 | Methyl Chloroform acetone 1:1 | 6 | 6 | 80 | 80 |

TABLE 5 – Continued

| Example No. | Adduct Example No. | Fluorine in Adduct % by wt.[1] | Solvent System | AATCC OIL REPELLENCY 0.2% F | AATCC OIL REPELLENCY 0.2% F[2] | AATCC WATER REPELLENCY 0.2% F | AATCC WATER REPELLENCY 0.2% F[2] |
|---|---|---|---|---|---|---|---|
| 49 | 14 | 57.11 | Methyl Chloroform acetone 1:1 | 6 | 6 | 80 | 80 |
| 50 | 15 | 53.00 | Methyl Chloroform acetone 1:1 | 6 | 5–6 | 70 | 70 |
| 51 | 35 | 50.97 | Methyl Chloroform acetone 1:1 | 6 | 5–6 | 0 | 0 |

[1]% fluorine as determined by elemental analysis
[2]Extended with polymethyl methacrylate to 20% fluorine in total solids.

TABLE 6

| Example No. | Adduct Example No. | Fluorine in Adduct % by wt. | Drying and Curing Conditions | AATCC OIL REPELLENCY 0.08%F | AATCC OIL REPELLENCY 0.04%F | AATCC OIL REPELLENCY With Extender[1] 0.08%F | AATCC OIL REPELLENCY With Extender[1] 0.12%F | AATCC WATER REPELLENCY 0.04% | AATCC WATER REPELLENCY With Extender[1] 0.08%F | AATCC WATER REPELLENCY With Extender[1] 0.12%F |
|---|---|---|---|---|---|---|---|---|---|---|
| 52 | 16 | 57.2 | Air dried | 6 | 4–5 | 6 | 6–7 | 50 | 60 | 70 |
|  |  |  | 3 Min. at 150°C | 5 | 4–5 | 6 | 6 | 70 | 70 | 70 |
| 53 | 17 | 55.2 | Air dried | 5 | 5 | 6 | 6–7 | 0 | 60 | 70 |
|  |  |  | 3 Min. at 150°C | 4–5 | 4 | 6 | 6–7 | 50 | 70 | 70 |
| 54 | 18 | 51.6 | Air Dried | 4 | 2–3 | 6 | 6 | 0 | 70 | 70 |
|  |  |  | 3 Min. at 150°C | 3–4 | 2 | 6 | 6 | 50 | 70 | 60 |
| 55 | 19 | 43.3 | Air dried | 4–5 | 4–5 | 6 | 6 | 0 | 50 | 70 |
|  |  |  | 3 Min. at 150°C | 4 | 2–3 | 6 | 6 | 50 | 0 | 60 |

[1]Extended with polymethyl methacrylate to 20% fluorine in total solids

TABLE 7

| Example No. | Adduct Example No. | Fluorine in Adduct % by wt. | Drying and Curing Conditions | AATCC OIL REPELLENCY 0.08%F | AATCC OIL REPELLENCY 0.04%F | AATCC OIL REPELLENCY With Extender[1] 0.08%F | AATCC OIL REPELLENCY With Extender[1] 0.12%F | AATCC WATER REPELLENCY 0.04% | AATCC WATER REPELLENCY With Extender[1] 0.08%F | AATCC WATER REPELLENCY With Extender[1] 0.12%F |
|---|---|---|---|---|---|---|---|---|---|---|
| 56 | 20 | 56.28 | Air dried | 5 | 4 | 5–6 | 6 | 50 | 60 | 70 |
|  |  |  | 3 Min. at 150°C | 5 | 4 | 5–6 | 6 | 50 | 60 | 70 |
| 57 | 21 | 53.9 | Air dried | 5 | 3–4 | 5 | 6 | 0 | 50 | 50 |
|  |  |  | 3 Min. at 150°C | 5 | 3 | 5 | 6 | 0 | 50 | 70 |
| 58 | 22 | 52.0 | Air dried | 5 | 3–4 | 5–6 | 6 | 0 | 60 | 70 |
|  |  |  | 3 Min. At 150°C | 6 | 3–4 | 6 | 6 | 50 | 50 | 70 |
| 59 | 23 | 49.1 | Air dried | 6 | 4 | 5 | 6 | 0 | 50 | 60 |
|  |  |  | 3 Min. at 150°C | 6 | 2–3 | 6 | 6 | 50 | 60 | 60 |

[1]Extended with polymethyl methacrylate to 20% fluorine in total solids.

TABLE 8

| Example No. | Adduct Example No. | Test Methods | Extended[1] Adduct on Cotton, 0.12%F OWF Air dried | Extended[1] Adduct on Cotton, 0.12%F OWF 3 Min.at 150°C |
|---|---|---|---|---|
| 60 | 16 | Oil Repellency, initial[2] | 6–7 | 6 |
|  |  | After 3 drycleanings[3] | 4–5 | 3 |
|  |  | After 3 home washes[4] | 3 | 4 |
|  |  | Soil Release Rating[5] | 3–4 | 3–4 |
|  |  | Oil Repellency after Soil Release | 5 | 6 |
| 61 | 17 | Oil Repellency, initial | 6–7 | 6–7 |
|  |  | After 3 drycleanings | 2 | 1–2 |
|  |  | After 3 home washings | 2–3 | 4 |
|  |  | Soil Release Rating | 3 | 3 |
|  |  | Oil Repellency after Soil Release | 4 | 5 |
| 62 | 22 | Oil Repellency, initial | 6 | 6 |
|  |  | After 3 drycleanings | 4–5 | 4–5 |
|  |  | After 3 home washes | 1 | 1 |
|  |  | Soil Release Rating | 3–4 | 3–4 |
|  |  | Oil Repellency after Soil Release | 2 | 2 |

[1]Extended with polymethyl methacrylate to 20% fluorine in total solids
[2]AATCC Test Method 118–1966 T
[3]AATCC Test Method 86–1970
[4]Home wash in Kenmore washing machine at 120°F, 45g Tide XK
[5]AATCC Test Method 130–1969

What is claimed is:
1. A compound of the formula

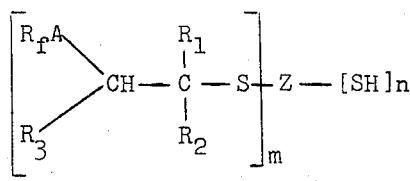

wherein
  $R_1$, $R_2$ and $R_3$ are hydrogen, methyl, $R_fA$ or $R_fACH_2$ and
  where at least one of $R_1$, $R_2$ and $R_3$ is $R_fA$ or $R_fACH_2$, $R_f$ is a perfluoroalkyl group of 2 to 18 carbon atoms, $R_fA$ is

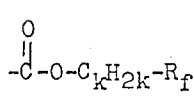

Z is
  $C(CH_2OOCCH_2CH_2)_3$
  $C(CH_2OOCCH_2)_3$
  $CH_3C(CH_2OOCCH_2CH_2)_3$
  $CH_3C(CH_2OOCCH_2)_3$
  $CH_3CH_2C(CH_2OOCCH_2CH_2)_3$
  $CH_3CH_2C(CH_2OOCCH_2)_3$
  $-O+CH_2-C-(CH_2OOCCH_2)_3 ]_2$ or
  $-O+CH_2-C(CH_2OOCCH_2CH_2)_3 ]_2$
$k$ is 1 or 2
$m$ is at least 1 and the sum of $m + n$ is 3, 4 or 6

2. The compound of claim 1 wherein $R_f$ contains 6 to 12 carbon atoms.

3. The compound of claim 1 of the formula:

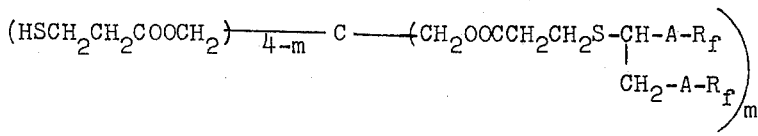

wherein $m$ is 1, 2, 3 or 4.

4. The compound of claim 3 wherein $R_f$ contains 6 to 12 carbon atoms.

5. The compound of claim 3 wherein $AR_f$ is $-COOCH_2CH_2R_f$.

6. The compound of claim 1 of the formula:

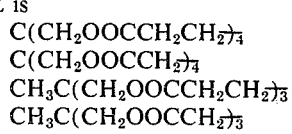

wherein Q is
a.
$-CH_2OOCCH_2CH_2SCHAR_f$ or
       $|$
       $CH_2AR_f$ b. $-CH_2OOCCH_2CH_2SH$
and the sum of (b) totals 3, 4, 5 or 6.

7. The compound of claim 6 wherein $R_f$ contains 6 to 12 carbon atoms.

8. The compound of claim 6 wherein $AR_f$ is $-COOCH_2CH_2R_f$.

9. The compound of claim 1 of the formula:

$(HSCH_2CH_2COOCH_2)_{4-m}$ C $(CH_2OOCCH_2CH_2SCH_2CH-A-R_f)_m$
                                                           $|$
                                                           $CH_2-A-R_f$ wherein $m$ is 1, 2, 3 or 4.

10. The compound of claim 9 wherein $R_f$ contains 6 to 12 carbon atoms.

11. The compound of claim 9 wherein $AR_f$ is $-COOCH_2CH_2R_f$.

12. An addition product of 2 moles/1 mole of bis(1,1-,2,2-tetrahydroperfluorodecyl) fumarate and pentaerythritol tetra (3-mercaptopropionate) of the formula:

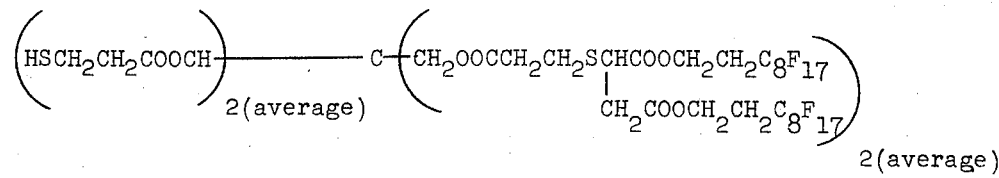

* * * * *